(12) United States Patent
Kurauchi

(10) Patent No.: US 8,250,941 B2
(45) Date of Patent: Aug. 28, 2012

(54) METHOD OF DESIGNING GEAR USING CAD SYSTEM, AND GEAR

(75) Inventor: Osamu Kurauchi, Toyohashi (JP)

(73) Assignee: Musashi Seimitsu Kogyo Kabushiki Kaisha, Toyohashi-Shi (JP)

( * ) Notice: Subject to any disclaimer, the term of this patent is extended or adjusted under 35 U.S.C. 154(b) by 1080 days.

(21) Appl. No.: 11/988,861

(22) PCT Filed: Jul. 21, 2006

(86) PCT No.: PCT/JP2006/314497
§ 371 (c)(1),
(2), (4) Date: Jan. 15, 2008

(87) PCT Pub. No.: WO2007/013373
PCT Pub. Date: Feb. 1, 2007

(65) Prior Publication Data
US 2009/0120227 A1 May 14, 2009

(30) Foreign Application Priority Data
Jul. 28, 2005 (JP) ................................ 2005-218475

(51) Int. Cl.
*F16H 55/00* (2006.01)
(52) U.S. Cl. .......................................... 74/460; 74/462
(58) Field of Classification Search .................... 74/460, 74/462; 29/893
See application file for complete search history.

(56) References Cited

U.S. PATENT DOCUMENTS

| | | | | |
|---|---|---|---|---|
| 5,647 A | * | 6/1848 | Semple | 74/421 R |
| 1,702,860 A | * | 2/1929 | Bottcher | 74/466 |
| 1,816,273 A | * | 7/1931 | Wildhaber | 74/462 |
| 2,059,612 A | | 11/1936 | Schellens | |
| 2,065,021 A | * | 12/1936 | Pioch et al. | 74/462 |
| 2,098,864 A | * | 11/1937 | Forster | 74/466 |

FOREIGN PATENT DOCUMENTS

| | | |
|---|---|---|
| JP | 09-053702 | 2/1997 |
| JP | 10-089442 | 4/1998 |
| JP | 11-118023 | 4/1999 |
| JP | 2003-94356 A | 4/2003 |
| WO | 03/091604 A1 | 11/2003 |

OTHER PUBLICATIONS

Patent Abstracts of Japan of JP 09-053702 dated Feb. 25, 1997.
Patent Abstracts of Japan of JP 10-089442 dated Apr. 7, 1998.
Patents Abstracts of Japan of JP 11-118023 dated Apr. 30, 1999.
Japanese Office Action dated 21, 2011 with English translation for Application No. 2007-528441.
English abstract of WO 03/091604 A1.
English abstract of JP 2003-94356 A.

* cited by examiner

*Primary Examiner* — Alicia Torres
(74) *Attorney, Agent, or Firm* — Ladas & Parry LLP

(57) ABSTRACT

A method of designing a gear in which a tooth trace of the tooth flank, which is to be engaged with another mating tooth flank, is curved with respect to an axial direction of the body of the gear. The mating tooth flank of the mating gear is designed in such a manner that a desired tooth contact can be achieved. Accordingly, sufficient design precision can be attained. Furthermore, stress at the tooth flanks can be controlled when the gears are engaged with each other, thereby leading to high durability of the gears.

2 Claims, 5 Drawing Sheets

US 8,250,941 B2

METHOD OF DESIGNING GEAR USING CAD SYSTEM, AND GEAR

FIELD OF THE INVENTION

This invention relates to a method of designing a gear to be used in a power transmission part of an automobile, for example. In particular, this invention relates to a method of designing a gear wherein a tooth trace of a tooth flank, which is to be engaged with another mating tooth flank, is curved with respect to an axial direction of the body of the gear.

BACKGROUND ART

In general, in a power transmission part. of an automobile or the like, gears may be used for transmitting a driving force between two shafts. As the gears, there are known a helical gear whose tooth trace is helical, and a circular arc gear whose tooth trace is circular arc. As a prior art document, there is known JP-A-59-137661.

In the gear, a tooth contact thereof is one of important matters. If a desired tooth contact is achieved, generation of contact noise can be inhibited when gears are engaged with each other. In addition, if a desired tooth contact is achieved, stress at tooth flanks of gears can be controlled when the gears are engaged with each other, which improves durability of the gears.

However, in such a gear that a tooth trace of a tooth flank, which is to be engaged with another mating tooth flank, is curved with respect to an axial direction of the body of the gear, it has been difficult to achieve a desired tooth contact, because conventionally the tooth trace is continuously formed into a circular arc from a tooth root of the gear to a tooth tip thereof.

SUMMARY OF THE INVENTION

The inventor has studied hard for achievement of a desired tooth contact, for a gear wherein a tooth trace of a tooth flank to be engaged with another mating tooth flank is curved with respect to an axial direction of the body of the gear. That is, the object of this invention is to provide a gear wherein a tooth trace of a tooth flank to be engaged with another mating tooth flank is curved with respect to an axial direction of the body of the gear, the gear being capable of achieving a desired tooth contact, inhibiting generation of contact noise at engagement, and achieving high durability, and also to provide a method of designing such a gear.

In order to achieve the above object, the present invention is a method of designing a gear, the method comprising: a first modeling step of modeling one tooth flank (4$a$) of one gear (W1$a$) in a CAD system, in such a manner that the one tooth flank (4$a$) is formed by continuously transitioning a tooth trace consisting of a circular arc (R1), from a tooth root of the gear to a tooth tip thereof; a first designing step of generating a tooth contact curve (R3) as a desired tooth contact position, on the one tooth flank (4$a$), in the CAD system; a second modeling step of modeling a hypothetical mating tooth flank (51) capable of coming in contact with the one tooth flank (4$a$) in the CAD system, in such a manner that the hypothetical mating tooth flank (51) is formed by continuously transitioning a hypothetical tooth trace consisting of a circular arc, from a tooth root of a gear to a tooth tip thereof; a second designing step of generating a mating tooth contact curve (R4) on the hypothetical mating tooth flank (51), so as to correspond to the tooth contact curve (R3) on the tooth flank (4$a$), in the CAD system; a contact-point calculating step of: extracting a plurality of hypothetical tooth traces (54) from the continuously transitioning hypothetical tooth trace from the tooth root to the tooth tip; and obtaining a plurality of contact points (55) of the plurality of hypothetical tooth traces (54) and the mating tooth contact curve (R4), in the CAD system; a third designing step of: judging whether or not each of the plurality of hypothetical tooth traces (54) has two contact points with the mating tooth contact curve (R4); if yes, generating a circle (62, 64) for each of the contact points (55$a$, 55$b$) in such a manner that the circle (62, 64) comes in contact with a circular arc being the corresponding hypothetical tooth trace (54) and has a diameter smaller than that of the circular arc being the corresponding hypothetical tooth trace (54); determining a circular arc (61, 63) formed by the circle (62, 64) as a tooth trace curve outside each of the contact points (55$a$, 55$b$); generating an ellipse (66) for the contact points (55$a$, 55$b$) in such a manner that the ellipse (66) comes in contact with the circular arc being the corresponding hypothetical tooth trace (54) at both the contact points (55$a$, 55$b$) and forms a predetermined gap (t) with the circular arc being the corresponding hypothetical tooth trace (54); and determining an elliptical arc (65) formed by the ellipse (66) as a tooth trace curve (R2) between the contact points (55$a$, 55$b$); in the CAD system; and a third modeling step of modeling a mating tooth flank (3$b$) of a mating gear (W1$b$) in the CAD system so as to come in contact with the one tooth flank (4$a$) of the one gear (W1$a$), in such a manner that the mating tooth flank (3$b$) is formed by connecting the tooth trace curves determined in the third designing step, from a tooth root (52) of the mating gear to a tooth tip (53) thereof.

According to the above invention, it is possible to design the mating tooth flank (3$b$) of the mating gear (W1$b$) in such a manner that a desired tooth contact is surely achieved.

Alternatively, the present invention is a method of designing a gear, the method comprising: a first modeling step of modeling one tooth flank (4$a$) of one gear (W1$a$) in a CAD system, in such a manner that the one tooth flank (4$a$) is formed by continuously transitioning a tooth trace consisting of a circular arc (RI), from a tooth root of the gear to a tooth tip thereof; a first designing step of generating a tooth contact curve (R3) as a desired tooth contact position, on the one tooth flank (4$a$), in the CAD system; a second modeling step of modeling a hypothetical mating tooth flank (51) capable of coming in contact with the one tooth flank (4$a$) in the CAD system, in such a manner that the hypothetical mating tooth flank (51) is formed by continuously transitioning a hypothetical tooth trace consisting of a circular arc, from a tooth root of a gear to a tooth tip thereof; a second designing step of generating a mating tooth contact curve (R4) on the hypothetical mating tooth flank (51), so as to correspond to the tooth contact curve (R3) on the tooth flank (4$a$), in the CAD system; a contact-point calculating step of: extracting a plurality of hypothetical tooth traces (54) from the continuously transitioning hypothetical tooth trace from the tooth root to the tooth tip; and obtaining a plurality of contact points (55) of the plurality of hypothetical tooth traces (54) and the mating tooth contact curve (R4), in the CAD system; a third designing step of: judging whether or not each of the plurality of hypothetical tooth traces (54) has two contact points with the mating tooth contact curve (R4); if yes, generating a circle (62, 64) for each of the contact points (55$a$, 55$b$) in such a manner that the circle (62, 64) comes in contact with a circular arc being the corresponding hypothetical tooth trace (54) and has a diameter smaller than that of the circular arc being the corresponding hypothetical tooth trace (54); determining a circular arc (61, 63) formed by the circle (62, 64) as a tooth trace curve outside each of the contact points (55$a$, 55$b$);

generating a curve for the contact points (55a, 55b) in such a manner that the curve comes in contact with the corresponding circular arc (61, 63) at each of the contact points (55a, 55b) and forms a predetermined gap (t) with the circular arc being the corresponding hypothetical tooth trace (54); and determining the curve as a tooth trace curve (R2) between the contact points (55a, 55b); in the CAD system; and a third modeling step of modeling a mating tooth flank (3b) of a mating gear (W1b) in the CAD system so as to come in contact with the one tooth flank (4a) of the one gear (W1a), in such a manner that the mating tooth flank (3b) is formed by connecting the tooth trace curves determined in the third designing step, from a tooth root (52) of the mating gear to a tooth tip (53) thereof.

According to the above invention as well, it is possible to design the mating tooth flank (3b) of the mating gear (W1b) in such a manner that a desired tooth contact is surely achieved.

It is preferable that: in the first modeling step, the one tooth flank (4a) of the one gear (W1a) is modeled in such a manner that the one tooth flank (4a) is formed by continuously transitioning a tooth trace consisting of a circular arc (R1), from the tooth root to the tooth tip, along an involute curve (L); in the second modeling step, the hypothetical mating tooth flank (51) is modeled in such a manner that the hypothetical mating tooth flank (51) is capable of coming in contact with the one tooth flank (4a) and is formed by continuously transitioning a hypothetical tooth trace consisting of a circular arc, from the tooth root to the tooth tip, along the involute curve (L); and in the third modeling step, the mating tooth flank (3b) of the mating gear (W1b), which is to come in contact with the one tooth flank (4a) of the one gear (W1a), is modeled in the CAD system in such a manner that the mating tooth flank (3b) is formed by transitionally connecting the tooth trace curves determined in the third designing step, from the tooth root (52) of the mating gear to the tooth tip (53) thereof, along the involute curve (L).

In addition, preferably, fifteen or more hypothetical tooth traces (54) are extracted in the contact-point calculating step. In that case, sufficient design precision can be guaranteed.

In addition, the present invention is a pair of gears, each of which has a tooth to be engaged with another mating tooth, wherein one tooth flank (4a) of one gear (W1a) is formed by continuously transitioning a tooth trace consisting of a circular arc (R1), from a tooth root of the gear to a tooth tip thereof; and wherein a mating tooth flank (3b) of a mating gear (W1b), which is to come in contact with the one tooth flank (4a), is formed by continuously transitioning a tooth trace curve (R2) consisting of two circular arcs (61, 63) and of a connecting curve (65) connecting the two circular arcs (61, 63), from a tooth root of the mating gear to a tooth tip thereof.

In the above gear, it is easy to obtain a desired tooth contact. Thus, contact noise can be inhibited. In addition, stress at the tooth flanks can be controlled when the gears are engaged with each other. Thus, the gears can have high durability.

Preferably, the connecting curve (65) is formed by an ellipse that comes in contact with the two circular arcs (61, 63) at connecting points of each other.

DESCRIPTION OF THE PREFERRED EMBODIMENT

Hereinafter, the present invention is described in details based on an embodiment thereof.

Figure 1:
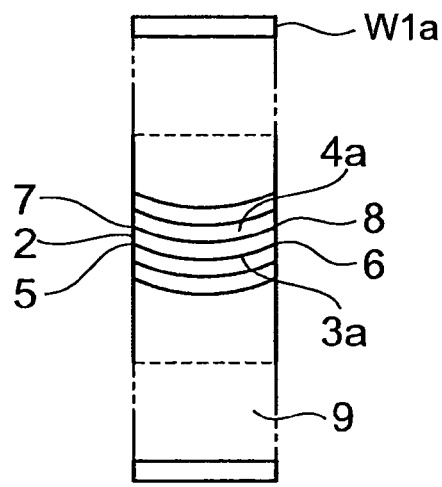
FIG. 1 is a front view of an embodiment of a gear according to the present invention.
Figure 2:
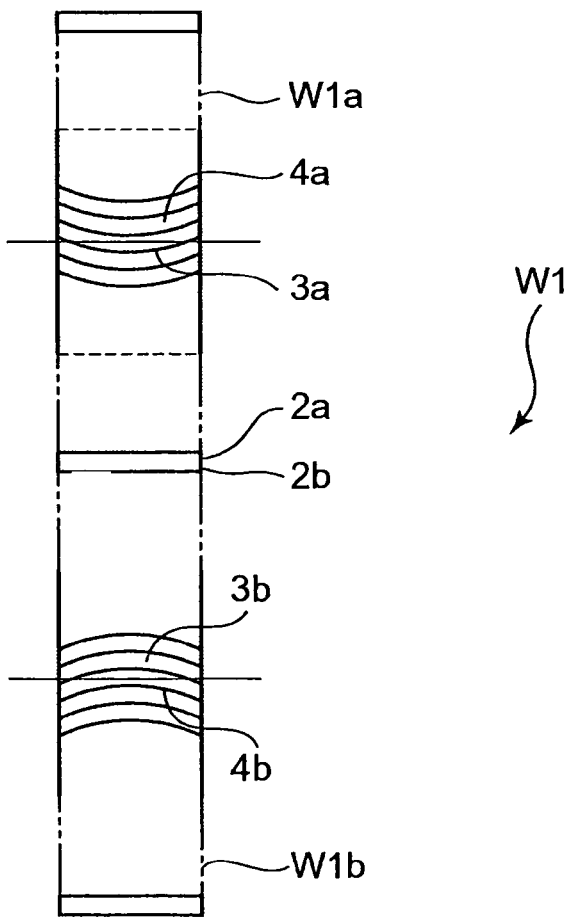
FIG. 2 is a front view showing an engagement state of the embodiment of a gear according to the present invention.
Figure 3A:
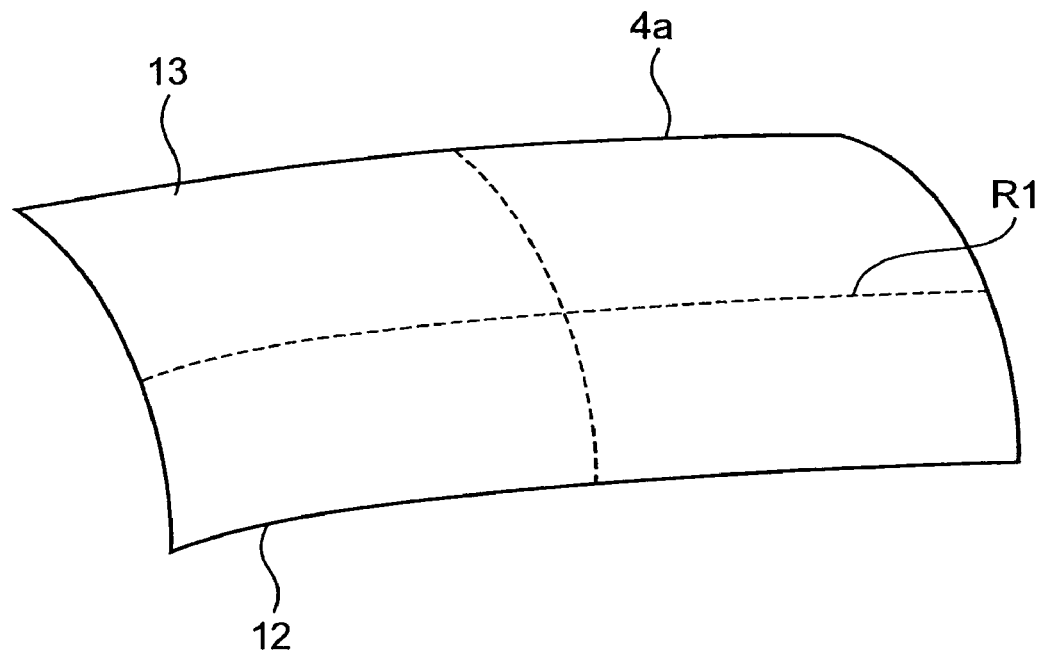
FIG. 3A is an explanatory view of a first modeling step in an embodiment of a method of designing a gear according to the present invention.
Figure 3B:
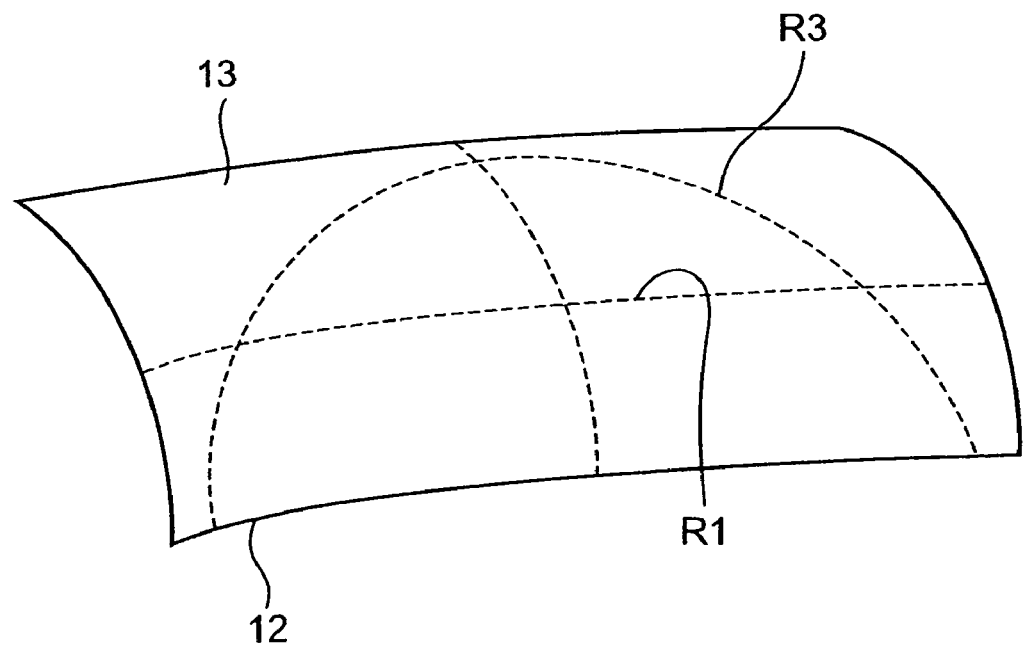
FIG. 3B is an explanatory view of a first designing step in the embodiment of a method of designing a gear according to the present invention.
Figure 4:
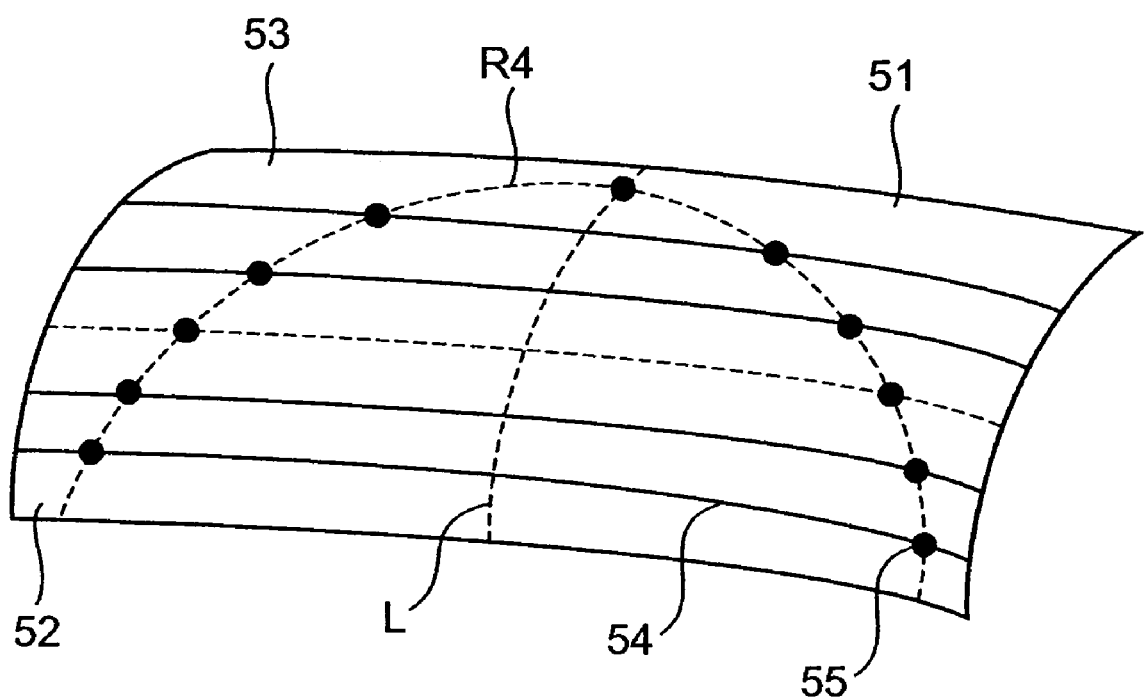
FIG. 4 is an explanatory view of a contact-point calculating step in the embodiment of a method of designing a gear according to the present invention.
Figure 5A:
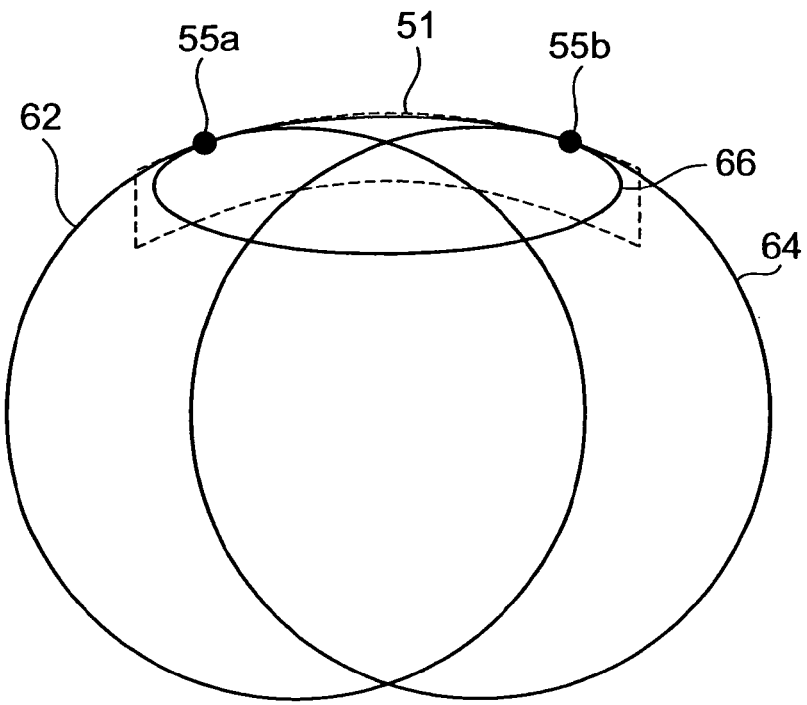
FIGS. 5A and 5B are explanatory views of a third designing step in the embodiment of a method of designing a gear according to the present invention.
Figure 6:
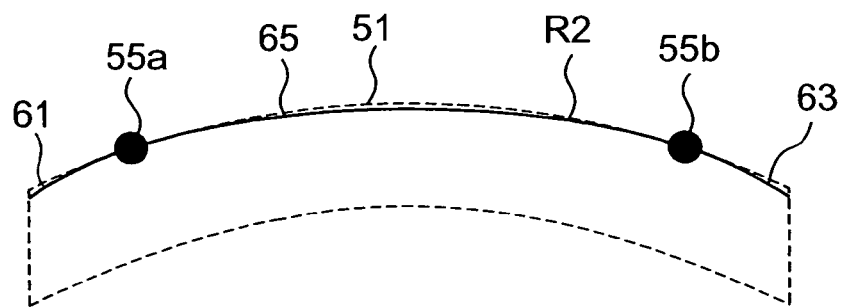
FIG. 6 is also an explanatory view of the third designing step in the embodiment of a method of designing a gear according to the present invention.
Figure 7:
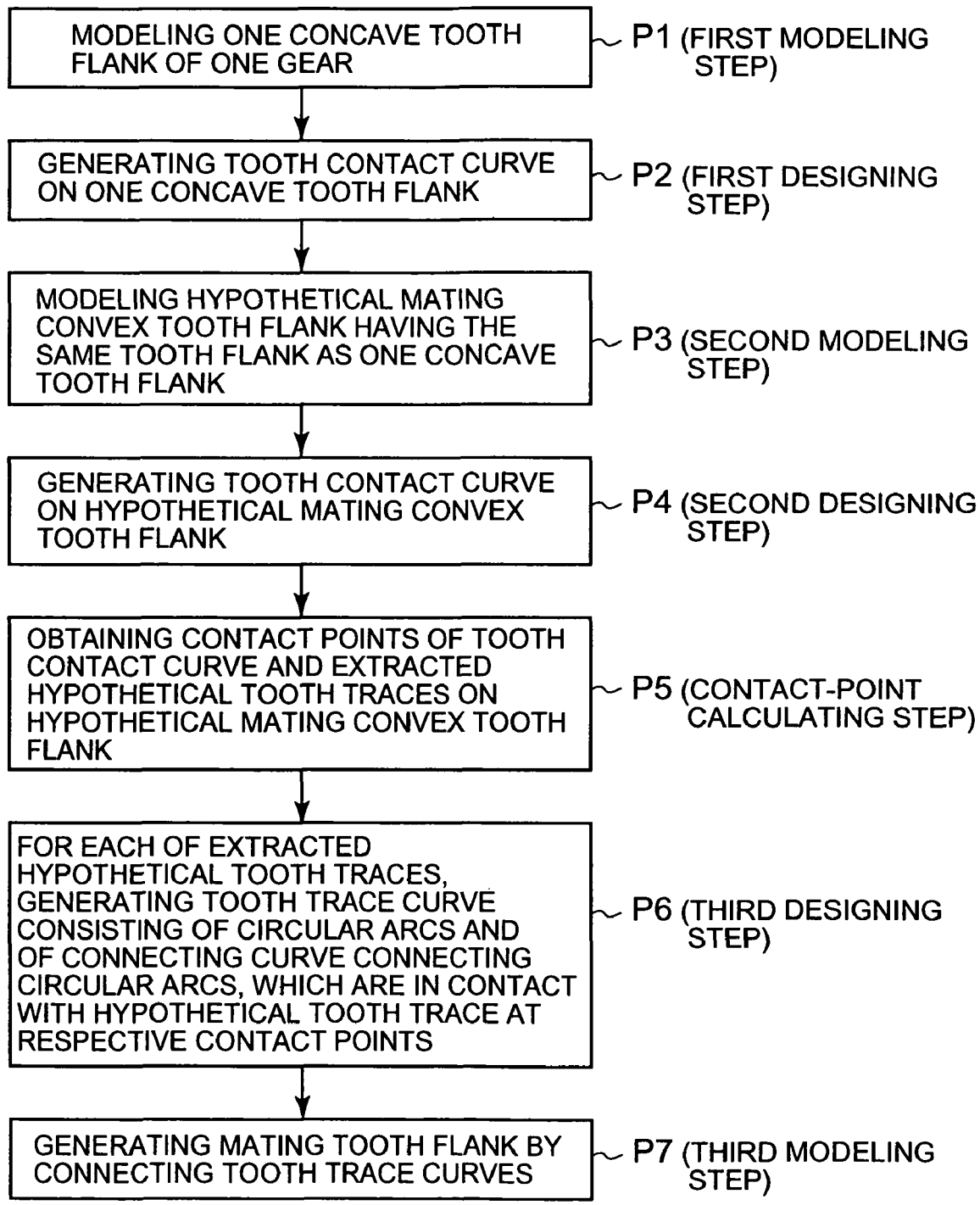
FIG. 7 is a flowchart of a method of designing a gear according to the present invention.

FIG. 1 is a front view of an embodiment of a gear according to the present invention. FIG. 2 is a front view showing an engagement state of the embodiment of a gear according to the present invention. FIG. 3A is an explanatory view of a first modeling step in an embodiment of a method of designing a gear according to the present invention. FIG. 3B is an explanatory view of a first designing step in the embodiment of a method of designing a gear according to the present invention. FIG. 4 is an explanatory view of a contact-point calculating step in the embodiment of a method of designing a gear according to the present invention. FIGS. 5A, 5A and 6 are explanatory views of a third designing step in the embodiment of a method of designing a gear according to the present invention. FIG. 7 is a flowchart of a method of designing a gear according to the present invention.

At first, with reference to FIG. 1, one gear W1a in a pair of gears W1 is explained.

The one gear W1a includes a cylindrical body 9, and a plurality of teeth 2 provided on an outer periphery of the body 9. The teeth 2 consist of convex tooth flanks 3a, each of which extends in a convex arc manner in a tooth trace direction, and concave tooth flanks 4a, each of which extends in a concave arc manner in the tooth trace direction. The position of a starting end portion (one end portion) 5 and the position of a terminating end portion (the other end portion) 6 of each convex tooth flank 3a are the same in a circumferential direction in the lateral view of the one gear W1a. In the same manner, the position of a starting end portion (one end portion) 7 and the position of a terminating end portion (the other end portion) 8 of each concave tooth flank 4a are the same in the circumferential direction in the lateral view of the one gear W1a.

Each of the concave tooth flanks 4a of the one gear W1a is formed by continuously transitioning a tooth trace consisting of a circular arc, from a tooth root of the gear to a tooth tip thereof, the circular arc being curved with respect to the axial direction of the cylindrical body 9. On the other hand, each of the convex tooth flanks 3a of the one gear W1a is formed by continuously transitioning a tooth trace curve (described below in details) consisting of circular arcs and of a connecting curve connecting the circular arcs, from a tooth root of the gear to a tooth tip thereof.

A mating gear W1b, which is to be engaged with the one gear W1a, has the same shape as the one gear W1a.

With reference to FIG. 2, an engagement state of the pair of gears W1 is explained. When the one gear W1a on a driving side rotates around a shaft center thereof, the mating gear W1b on a driven side also rotates around a shaft center thereof, via the engaged (mating) teeth 2a, 2b, synchronously. At that time, the convex tooth flanks 3a of the one gear W1a on the driving side come in contact with the concave tooth flanks 4b of the mating gear W1b on the driven side, and the concave tooth flanks 4a of the one gear W1a on the driving side come in contact with the convex tooth flanks 3b of the mating gear W1b on the driven side, so that a driving force is transmitted therebetween.

Next, a designing method by means of a three-dimension CAD system, for designing the above pair of gears, is explained.

At first, as a first modeling step, as shown in FIG. 3A, one concave tooth flank 4a of the one gear W1a is modeled in the three-dimension CAD system (P1: see FIG. 7). In the one concave tooth flank 4a, a tooth trace consisting of a circular arc R1 is continuous (continuously transitioned) from a tooth root 12 of the gear W1a to a tooth tip 13 thereof.

Then, as shown in FIG. 3B, a tooth contact curve R3 consisting of desired tooth-contact-points of the mating convex tooth flank 3b is generated on the one concave tooth flank 4a (P2: first designing step). The tooth contact curve R3 is a curve connecting tooth contact points each of which achieves a large mating rate. Specifically, the tooth contact curve R3 is a curve of substantially a semicircle which extends from the tooth root(s) 12 near both ends of the concave tooth flank 4a in the tooth trace direction to the tooth tip 13 located centrally in the tooth trace direction.

Next, as a second modeling step, as shown in FIG. 4, a three-dimensional model of a hypothetical mating convex tooth flank 51 is formed in the CAD system in such a manner that the hypothetical mating convex tooth flank 51 has a hypothetical tooth trace consisting of the same circular arc as that in the one concave tooth flank 4a (P3). In the hypothetical mating convex tooth flank 51, the hypothetical tooth trace consisting of the same circular arc is continuous (continuously transitioned) from a tooth root to a tooth tip.

Then, a mating tooth contact curve R4 corresponding to the tooth contact curve R3 of the concave tooth flank 4a of the one gear W1a is generated on the hypothetical mating convex tooth flank 51 (P4: second designing step).

Then, a plurality of hypothetical tooth traces 54 is extracted from the continuously transitioning hypothetical tooth trace from the tooth root to the tooth tip, and a plurality of contact points 55 by the plurality of hypothetical tooth traces 54 and the mating tooth contact curve R4 is obtained (P5: contact-point calculating step). In the present embodiment, about twenty hypothetical tooth traces 54 are extracted (some of them are omitted in the drawing). If fifteen or more hypothetical tooth traces 54 are extracted, sufficient design precision can be guaranteed. In addition, the contact points 55 in the present embodiment are symmetrical in the tooth trace direction with respect to a central involute curve L, which extends from a tooth root 52 to a tooth tip 53 through center(s) of the tooth trace(s).

Next, for each of the extracted hypothetical tooth traces 54, it is judged whether the number of obtained contact points is two or not. If the number is two, as shown in FIG. 5A, a first circular arc 61 is generated in such a manner that the first circular arc 61 comes in contact with the corresponding hypothetical tooth trace 54 at the first contact point 55a, which is one of the contact points (P6: third designing step). The first circular arc 61 is a circular arc formed by a first circle 62 whose diameter is smaller than that of a circle forming the corresponding hypothetical tooth trace 54.

Then, at the second contact point 55b, in the same way as the first contact point 55a, a second circular arc 63 is generated in such a manner that the second circular arc 63 comes in contact with the corresponding hypothetical tooth trace 54 at the second contact point 55b and that the second circular arc 63 is formed by a second circle 64 whose diameter is smaller than that of the circle forming the corresponding hypothetical tooth trace 54 (P6: third designing step). Herein, the second contact point 55b and the first contact point 55a are on the common corresponding hypothetical tooth trace 54, and are symmetrical with respect to the central involute curve L extending from the tooth root 52 to the tooth tip 53 through the center(s) of the tooth trace(s).

Figure 5B:
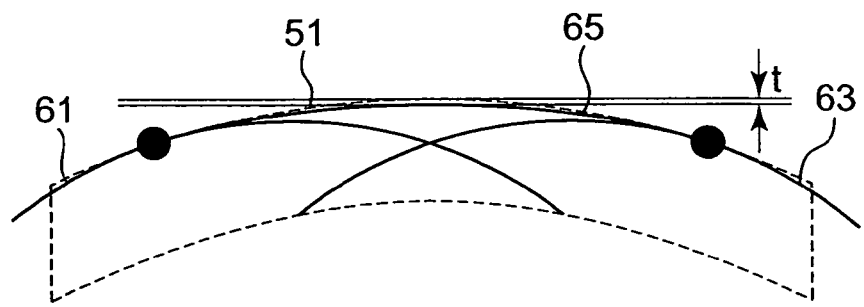

Next, a connecting curve 65 connecting with the first circular arc 61 at the first contact point 55a and connecting with the second circular arc 63 at the second contact point 55b is generated (P6: third designing step). As shown in FIG. 5B, the connecting curve 65 is a curve formed by an ellipse 66, which forms a gap t with the hypothetical tooth trace 54 of the hypothetical mating convex tooth flank 51. Herein, the ellipse 66 is in contact with the hypothetical tooth trace 54 of the hypothetical mating convex tooth flank 51 both at the first contact point 55a and at the second contact point 55b.

Next, the two circular arcs 61, 63 and the connecting curve 65, which are in contact with the hypothetical tooth trace 54 at the first contact point 55a and at the second contact point 55b, are connected so as to generate a tooth trace curve R2 (P6: third designing step).

Regarding the other contact points, for each of the extracted hypothetical tooth traces 54, a tooth trace curve R2 is generated. That is, the same number of tooth trace curves R2, each of which consists of two circular arcs and a connecting curve, is generated as the number of the extracted hypothetical tooth traces. By connecting (continuously transitioning) these tooth trace curves, a model of a mating convex tooth flank 3b can be generated (P7: third modeling step).

In the above pair of gears W1, the one gear W1a and the mating gear W1b have the same shape. That is, the mating convex tooth flanks 3b of the mating gear W1b so as to come in contact with the concave tooth flanks 4a of the one gear W1a are the same as the one convex tooth flanks 3a of the one gear W1a. Therefore, the model of a mating convex tooth flank 3b that has been designed according to the above procedures is used as the one convex tooth flank 3a. That is, the one gear W1a is modeled in the CAD system in such a manner that the one gear W1a has: one concave tooth flanks 4a formed by transitioning the tooth trace R1 consisting of the circular arc continuously from the tooth root to the tooth tip, and one convex tooth flanks 3a formed by connecting the tooth trace curves R2, each of which consists of two circular arcs and a connecting curve, continuously from the tooth root to the tooth tip.

As described above, according to the present embodiment, the mating convex tooth flanks 3b of the mating gear W1b can be designed in such a manner that the mating convex tooth flanks 3b of the mating gear W1b achieve a desired tooth contact with the concave tooth flanks 4a of the one gear W1a.

In the above embodiment, the mating convex tooth flank 3b is designed based on the concave tooth flank 4a of the one gear W1a. However, the reverse designing is also possible. That is, after the one convex tooth flank 3a of the one gear W1 is modeled, based on a desired tooth contact with the modeled one convex tooth flank 3a, the mating concave tooth flank 4b of the mating gear W1b may be modeled according to the above procedures.

In addition, in the above embodiment, a desired tooth contact is defined as the tooth contact curve which extends from the tooth roots near both ends in the tooth trace direction to the tooth tip located centrally in the tooth trace direction. However, this invention is not limited thereto. The tooth contact positions may be changed in dependence on purpose or the like.

Furthermore, in the above embodiment, module 2.0 is assumed, so that about twenty hypothetical tooth traces 54 are extracted in the contact-point calculating step. However, this invention is not limited thereto. In order to obtain sufficient modeling precision, an appropriate number of hypothetical tooth traces 54 may be extracted. In general, if fifteen or more hypothetical tooth traces are extracted, sufficient design precision will be guaranteed. Herein, it is preferable that the hypothetical tooth traces are extracted at regular intervals.

In addition, in the above embodiment, as shown in FIG. 5B, the connecting curve 65 is formed by the ellipse 66 which forms the gap t from the hypothetical tooth trace 54 and which is in contact with the hypothetical tooth trace 54 both at the first contact point 55a and at the second contact point 55b. However, other manners may be adopted. That is, specifically, the connecting curve 65 may be any curve as long as the curve forms the gap t from the hypothetical tooth trace 54 and comes in contact with the first circular arc 61 at the first contact point 55a and with the second circular arc 63 at the second contact point 55b.

The invention claimed is:

1. A pair of gears, each of which has a tooth to be engaged with another mating tooth, wherein
one tooth flank (4a) of one gear (W1a) is designed using a CAD system by continuously transitioning a tooth trace consisting of a circular arc (R1), from a tooth root of the gear to a tooth tip thereof, and
a mating tooth flank (3b) of a mating gear (W1b), which is to come in contact with the one tooth flank (4a), is designed using a CAD system by continuously transitioning a tooth trace curve (R2) consisting of two circular arcs (61, 63) and of a connecting curve (65) connecting the two circular arcs (61, 63), from a tooth root of the mating gear to a tooth tip thereof, each circular arc (61, 63) being formed by a circle (62, 64), the circle (62, 64) being generated, for each of two contact points at which a hypothetical tooth trace (54) contacts with a mating contact curve (R4), in such a manner that the circle (62, 64) comes in contact with a circular arc being the corresponding hypothetical tooth trace (54) and has a diameter smaller than that of the circular arc being the corresponding hypothetical tooth trace (54).

2. A pair of gears according to claim 1, wherein
the connecting curve (65) is formed by an ellipse that comes in contact with the two circular arcs (61, 63) at connecting points of each other.

\* \* \* \* \*